United States Patent [19]

Spanoudis

[11] 4,356,815

[45] Nov. 2, 1982

[54] SOLAR ENERGY COLLECTOR HAVING AN ABSORBER ELEMENT OF COATED FOIL

[75] Inventor: Louis Spanoudis, Toledo, Ohio

[73] Assignee: Owens-Illinois, Inc., Toledo, Ohio

[21] Appl. No.: 179,902

[22] Filed: Aug. 19, 1980

[51] Int. Cl.³ .............................................. F24J 3/02
[52] U.S. Cl. .................................... 126/443; 126/446; 126/449; 29/157 R; 29/157.3 R; 29/455 R; 29/DIG. 44
[58] Field of Search ............... 126/417, 443, 449, 442, 126/901, 432, 446; 136/246, 259, 245; 220/424; 29/157 R, 157.3 R, DIG. 44, 455 R

[56] References Cited

U.S. PATENT DOCUMENTS

| | | | |
|---|---|---|---|
| 1,388,248 | 8/1921 | Fate | 29/DIG. 44 X |
| 3,000,375 | 9/1961 | Golay | 126/417 |
| 3,225,954 | 12/1965 | Herrick et al. | 220/424 X |
| 3,227,153 | 1/1966 | Godel et al. | |
| 3,920,413 | 11/1975 | Lowery | |
| 3,952,724 | 4/1976 | Pei | |
| 3,957,029 | 5/1976 | Nozik et al. | |
| 3,968,786 | 7/1976 | Spielberg | 126/901 X |
| 4,016,860 | 4/1977 | Moan | |
| 4,029,080 | 6/1977 | Warren | 126/901 X |
| 4,033,327 | 7/1977 | Pei | |
| 4,043,318 | 8/1977 | Pei | |
| 4,055,707 | 10/1955 | McDonald | |
| 4,084,577 | 4/1978 | Rhodes | 126/900 X |
| 4,134,391 | 1/1979 | Mahdjuri et al. | 126/443 X |
| 4,171,993 | 10/1979 | Albertson | 126/417 X |
| 4,232,731 | 11/1980 | Kaplow et al. | 126/901 X |
| 4,233,957 | 11/1980 | Kenny | 126/443 |

FOREIGN PATENT DOCUMENTS 2003597  3/1979  United Kingdom .

OTHER PUBLICATIONS

"Physics of Thin Films", by G. Haas and R. E. Thun, vol. 2, Academic Press, 1964, pp. 353 to 357.
"High Absorptivity Solar Absorbing Coatings", by D. M. Mattox and R. R. Sowell, J. Vac. Sci. Technol., vol. 11, No. 4, Jul./Aug. 1975, pp. 793-796.
"Principles and Applications of Selective Solar Coatings", by J. Jurisson, R. E. Peterson, and H. Y. B. Mar, J. Vac. Sci. Technol., vol. 12, No. 5, Sep./Oct. 1975, pp. 1010-1015.

Primary Examiner—Larry Jones
Attorney, Agent, or Firm—Richard D. Heberling; Myron E. Click; David H. Wilson

[57] ABSTRACT

A solar energy collector and process for its preparation are disclosed in which the collector comprises spaced apart wall members in which one wall member is adapted to face solar radiation, and the other wall member is spaced on the remote side of the first wall member and adapted to contact a heat-absorbing medium. A foil, disposed between the wall members, has coatings on its opposite sides. The side of the foil facing the wall member receiving solar radiation has a solar selective coating, and the other side of the foil facing the other wall member has an emissive coating providing relatively high emissivity in the infrared spectrum. Preferably, the foil is metallic and precoated prior to assembling with other parts of the solar collector.

17 Claims, 5 Drawing Figures

SOLAR ENERGY COLLECTOR HAVING AN ABSORBER ELEMENT OF COATED FOIL

BACKGROUND OF THE INVENTION

The present invention relates to a solar energy collector having an improved absorbing layer of a coated foil adapted to decrease the cost of manufacturing the collector while providing still other improvements.

Realization that the fossil fuel supply of the world is finite, and may be rapidly depleted at the present rate of national energy consumption, has led to a search for substitute energy resources. Use of solar radiation is one possibility for providing clean and reliable energy.

Solar energy is an extensive, constant energy source whose economic feasibility depends on efficient collection, retention, and utilization. The efficiency of some solar collecting systems has been low due to excessive heat losses. One area in which improvement has been sought is in solar selective absorber coatings, that is, coatings which absorb energy particularly well in the solar spectrum while minimizing heat loss by radiation. For example, such coatings are designed to collect thermal energy from exposure to solar radiation and then transmit the collected energy through other media either to heat or cool homes and buildings through heat exchangers.

In general, when radiant energy from the sun impinges on a cooler object, part of the energy is reflected and lost and the balance either absorbed or transmitted away. The absorber energy may be re-radiated at a longer wavelength. Accordingly, a coating which absorbs in the range of solar radiation becomes heated, provided the surface does not re-radiate or emit most or all of the energy collected.

Solar radiation reaching the surface of the earth is almost entirely confined to wavelengths in the range of 0.3 to 2.5 microns. It is estimated that about 90% of solar radiation is at wavelengths of about 0.4 microns to about 1.5 microns. The amount of radiation above 2.5 microns is negligible. Solar energy selective coatings, therefore, are designed to differentiate in their absorption, reflection or transmission characteristics between wavelengths above about 2.5 microns and wavelengths below about 2.5 microns. Thus, solar energy can be collected at wavelengths below about 2.5 microns and the collected energy then transferred to useful application at wavelengths above about 2.5 microns.

This also means that for effective collection and retention, a solar collector should absorb strongly at wavelengths below about 2.5 microns. A coating which has a high absorptivity, usually termed alpha, in the solar spectrum but a low emissivity, epsilon, at the temperature at which the collector operates may be called a solar selective coating. Even though a high alpha to epsilon ratio is desirable, it is essential that the alpha value be near one to collect as much of the available energy as possible.

Solar selective coatings are an important way to increase the efficiency of solar energy collectors, primarily by maximizing the absorption of solar energy and minimizing the energy lost by radiation. However, solar selective coatings can still suffer from several shortcomings. For example, the preparation of such coatings involves vacuum evaporation techniques which are relatively expensive. Normally, the vacuum deposition is made directly onto parts of the solar energy collector. This requires thorough cleaning of the parts to insure a properly adherent coating. Moreover, "no-flow" conditions of a collector, that is, when a heat-absorbing medium is not being circulated through the collector, decrease the stability of prior solar energy absorptive coatings over a period of time.

SUMMARY OF THE INVENTION

An object of the invention is to provide an improved solar energy collector. Another object is to provide an absorber element for a collector comprising coated foil. A related object is to provide a solar energy absorbent element comprising a coated foil that is insensitive to the presence of surface contaminants on other parts of the collector. A further object is to provide a solar energy absorber element having increased long-term stability.

These and other objects are realized by a solar energy collector which, in one form, comprises spaced-apart wall members of which one wall member is adapted to face solar radiation and the other wall member is spaced on the remote side of the first wall member and adapted to contact a heat-absorbing medium. The wall members are preferably fabricated from glass.

A coated foil, such as a precoated metallic foil, is disposed between the wall members and has coatings on its opposite sides. The side of the foil facing the wall member exposed to solar radiation has a solar selective coating comprising a semi-conductor material, and the side of the coated foil facing the other wall member has an emissive coating providing relatively high emissivity in the infrared spectrum.

The solar energy collector may be either of the flat plate or tubular type and the space between the wall members preferably is maintained at a subatmospheric pressure. The coated foil acts as a photothermal energy converter and may be easily and readily placed in position without undue regard for the presence of contaminants on the wall members.

In preparing the present solar energy collector, the foil may be precoated on both sides and then assembled between the wall members. Or just the emissive coating may be precoated, and the solar selective coating deposited on the foil after it has been placed in position.

DESCRIPTION OF THE PREFERRED EMBODIMENT

Figure 1:
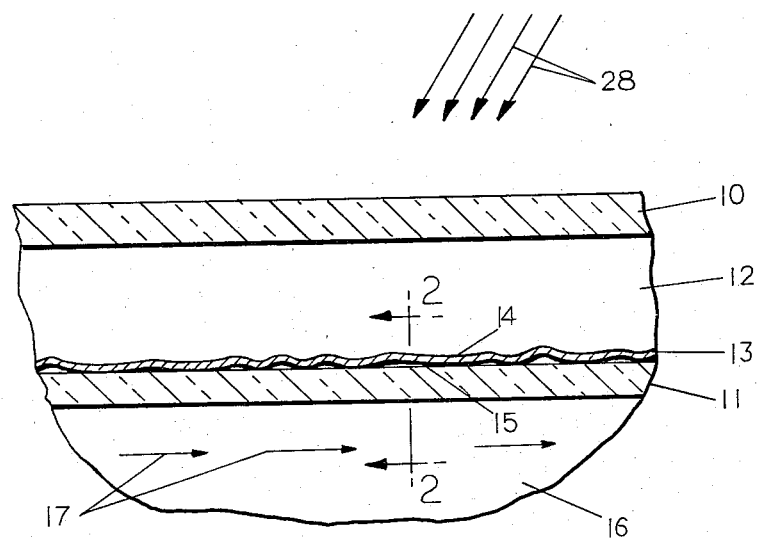
FIG. 1 is a fragmentary, highly magnified, cross-section of a solar energy collector of the present invention.

The foil and the coatings on its opposite sides, which principally define the present absorber element, are described in detail, followed by a description of assembling the foil with other parts of a solar energy collector, and of the operation of the collector upon exposure to solar radiation. Examples of solar collectors embodying the present foil are described as well as the increase in stability obtained by the present foil as compared to conventionally applied solar selective coatings.

In the present solar collector, instead of coating a member of the collector with a solar selective material or an emissive material by relatively expensive and tedious operations, such as vacuum deposition upon an integral part of the collector itself, a sheet member such as a foil may be coated with a solar selective material and optionally with an emissive material as well to form an absorber element prior to assembly with other parts of the collector.

The sheet member may be fabricated from any suitable material which can be cast, calendered, or otherwise shaped in the form of a sheet, such as known thermosetting and thermoplastic resinous materials. However, the sheet member is preferably metallic foil. In this respect, any metal may be used as the foil which is sufficiently ductile to be formed in this shape. As examples, aluminum, copper, chromium, nickel, molybdenum, stainless steel and alloys thereof may be used. Gold and silver and their alloys are also operable for this purpose, but their high cost makes their use prohibitive. Aluminum, copper and nickel wrap are preferred. The thickness of the foil or other sheet member is not critical. Preferably the foil should be sufficiently thick to be relatively stiff to the point where it is self-supporting but yet sufficiently flexible that it can be shaped and placed as desired within a solar energy collector as hereinafter described. In general, the foil may have a thickness from about 0.5 to about 15 mils.

The foil is coated on both sides or faces. On the side that is to be exposed to solar radiation, the foil has a solar selective coating. On the other side that is to be exposed in practice to a heat-absorbing medium, the foil has an emissive coating. It is much easier and simpler to precoat the foil as such, unencumbered by the presence of other parts of a solar energy collector, and then to assemble it with such other parts, rather than to directly form or create an absorber element in situ within a collector. Foil coating processes are well-known and do not themselves form part of the present invention. Foils can be coated, for example, in foil form by electroplating, vapor or vacuum deposition, cladding, hot dipping, and the like. These processes are neither capital nor labor intensive in cost. Further, these processes are carried out directly on the foil alone. On the other hand, coatings applied by vacuum techniques directly onto surfaces of a solar collector require those surfaces to be cleaned prior to such application. Foil wrapped solar absorber tubes of the type hereinafter described are insensitive to surface contaminants.

The solar selective coating is preferably a semiconductor material that absorbs strongly in the solar spectrum and that is essentially transparent in the infrared spectrum. As used here and in the claims, the term "semiconductor" is taken to mean a material as defined by the "American Institute of Physics Handbook", second edition, 1963, page 9-31, namely, a material in which the highest occupied energy band (valence band) is completely filled at absolute zero; and in which the energy gap between the valence band and the next higher band (conduction band) is of the order of 0.4 to 5 electron volts.

In general, incompletely oxidized oxides of the transitional metal elements provide the best results and are therefore preferred as the semiconductor materials. Specific semiconductor materials useful for the second coating include black chrome, black nickel, black platinum, black molybdenum, black copper, black iron, black cobalt, black manganese, and compatible alloys thereof. Black chrome is a mixture of the oxides of chromium and is designated in the art as $CrO_x$. Similarly, black nickel is a mixture of the oxides of nickel. Black platinum, black molybdenum, black copper, black iron, black cobalt, and black manganese are oxides of these metals.

However, the semi-conductor material can be other than metal oxides. For example, carbides of the same and other metals having semiconductor properties may be used, such as copper carbide, hafnium carbide, nickel carbide, and the like. Also, sulfides of the same and other metals having semi-conductor properties may be similarly used, such as silver sulfide, iron sulfide, manganese sulfide, and the like. Still further, elemental metals like silicon and germanium can be used as the semiconductor material.

Other solar selective coatings that may be used are described in "Physics of Thin Films", by Hass and Thun, Volume 2, Academic Press 1964, pages 353 to 357.

The emissive coating may comprise any material providing relatively high emissivity in the infrared spectrum. Among useful materials for this purpose are glass, lampblack, graphite, alumina, silica, titania, zirconia, potassium silicate, sodium silicate, magnesia, and calcia. The thicknesses of the solar selective and emissive coating are not critical. As a rule, the thickness of each coating may range from about 0.03 to about 5 mils.

The present sheet member or foil which serves as an absorber element can be used in any type of solar collector system in which the solar selective coating is exposed to solar radiation, and the emissive coating is directed to a heat-absorbing medium which serves as a transport for the collected solar energy. Accordingly, the present absorber element can be incorporated in a flat plate collector, such as a flat composite panel, a glass tubular collector, and the like.

Figure 2:
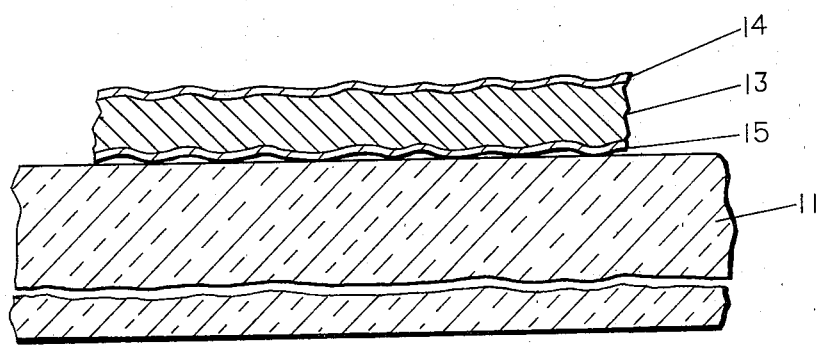
FIG. 2 is a fragmentary, further magnified, cross-section of the collector of FIG. 1 on the line 2—2.
Figures 3, 4:
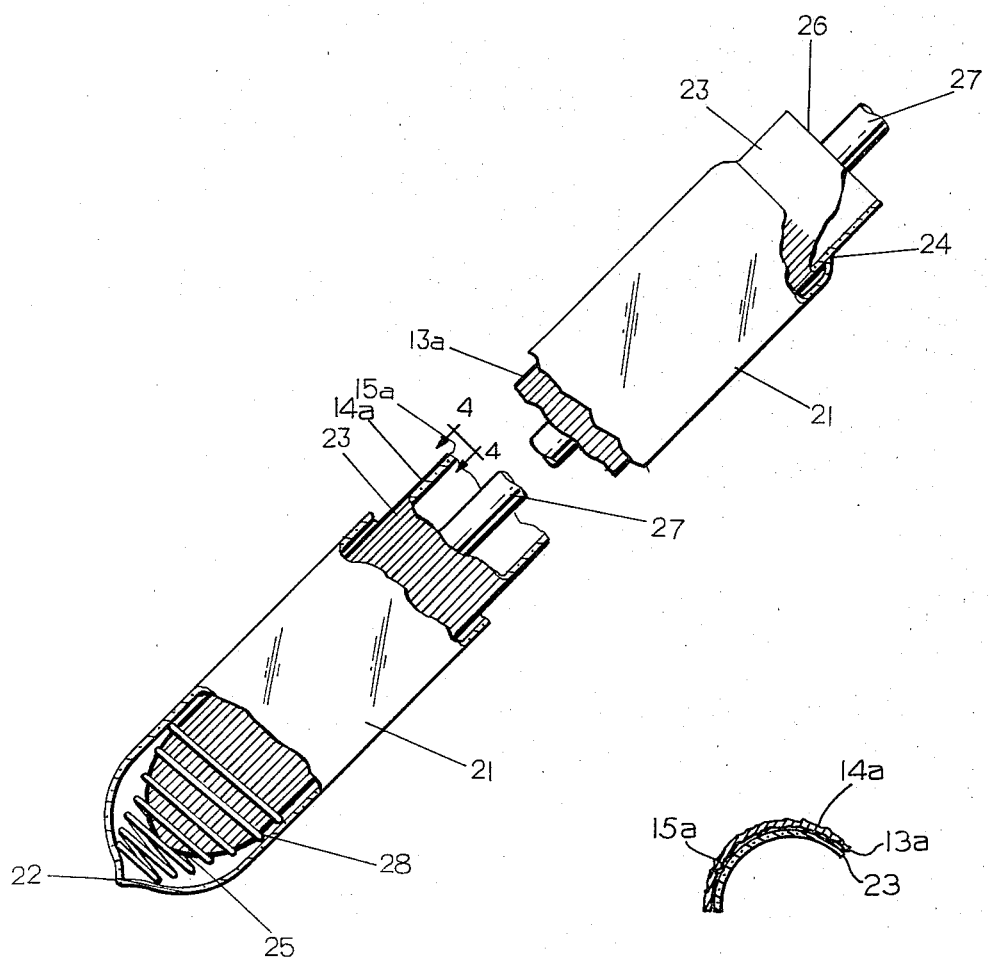
FIG. 3 is a side elevational view, partly in section, of a tubular solar energy collector having a coated foil of the present invention.
FIG. 4 is an enlarged, cross-sectional view of FIG. 3 on the line 4—4.

FIGS. 1 through 3 illustrate two collector systems that contain the present foil or the like. FIG. 1 semi-schematically shows a panel that is part of a flat plate. A pair of spaced, transparent wall members 10 and 11 are supported, as along their peripheries, in spaced relation to leave an open interstitial space 12 in which an aluminum foil 13 is placed. The foil may be simply left in space 12 with reliance on gravity to hold it against wall member 11; or if desired the foil may be anchored in place by ties, cords, coil springs, and the like. The use of adhesives to fix foil 13 to one member or the other is not necessary or recommended. In fact, tight adherence of foil 13 to a wall member can be disadvantageous due to differences in thermal expansion between the foil and a wall member.

Aluminum foil 13 has a solar selective coating 14 along an upper side (as viewed in FIGS. 1 and 2) that is exposed to solar radiation, and an emissive coating 15 of carbon black along its underside exposed to a heat-absorbing medium 16 which flows along wall member 11 collecting the heat absorbed and then emitted by foil 13 and its coatings. Medium 16 transports the heat energy as indicated by arrows 17 to a useful site as is known in the art, such as to a heat exchanger. Medium 16 can be a gas or liquid.

FIG. 3 illustrates a double-wall, glass tubular collector of the type described in U.S. Pat. No. 4,033,327 to Y.

K. Pei. This embodiment includes a collector generally represented at 20 comprising concentric, transparent glass tubes. An outer or cover tube 21 is circumferentially transparent, open at the right hand end, as viewed in FIG. 3, and closed at the opposite end when tipping off the tubulation as at 22. The open end of cover tube 21 is sealed to an inner glass absorber tube 23 by a glass-to-glass hermetic seal at 24. The seal space between the tubes 21 and 23, respectively, is evacuated to a hard vacuum (for example, $10^{-4}$ to $10^{-6}$) and the tubulation 17 is sealed off in a known manner.

Absorber tube 23 is preferably made of glass and has a lesser outside diameter and slightly greater length than the inside diameter and length, respectively, of cover tube 21. Tube 23 is closed at end 25 and open at the opposite end 26.

A metallic foil 13a similar to that described for the embodiment of FIGS. 1 and 2 lies intermediate tubes 21 and 23 and has a solar selective coating 14a on its outer surface and an emissive coating 15a on its inner surface. Foil 13a may be placed in any manner between tubes 21 and 23. For example, the foil may be rolled in a sleeve or tubular form and then inserted between the tubes so as to telescope absorber tube 23. Such a sleeve may be formed, for instance, from foil measuring about 5 to 10 inches in width, depending in part on the length of tubes 21 and 23.

Again foil 13a should not be intimately adhered to either tube, such as tube 23, so as to resist relative movement between the foil and tube upon expansion due to heat and subsequent contraction. Preferably, the foil is sufficiently thick or stiff to retain its shape. While not essential, a loose securance of foil 13a to a tube is preferred. This may be accomplished by ties of any sort, a wire (not shown) spiraled around foil 13a and tube 23, elastic bands, and the like.

Completing the structure of the solar energy collector of FIG. 3, a central feeder tube 27 of smaller diameter than tube 23 may be inserted into open end 26 of the absorber tube to extend longitudinally of concentric tubes 21 and 23 to a point near the closed end 25 of absorber tube 23. End 25 nests within a coiled spring 28 which resiliently retains that end of the tube 23 in place. The open end 26 of the absorber tube together with the open end of feeder tube 27 seat in a sealed relation within a manifold (not shown) which carries a number of collector tube assemblies like that illustrated by FIG. 3. In operation, a fluid circulates from the manifold, through tube 27, the annular area between tube 27 and tube 23 and then back to the manifold to remove heat energy collected in collector 20. Another example of fluid circuitry in an operating tubular collector of this type is shown in U.S. Pat. No. 4,120,285.

Foils 13 and 13a are normally pre-coated with the described coatings prior to the time they are assembled in a solar collector. This is the preferred practice and best mode in order to take advantage of easier and less expensive coil coating techniques, such as vacuum deposition of the coatings. However, it is possible and within the contemplation of the invention to pre-coat one coating such as the emissive coating and later apply, as by vacuum evaporation, the solar selective coating while the foil is in place within a collector. This technique is more apt to be followed when the foil is not highly reflective, such as are aluminum, nickel, copper, and the like, and a flash coating of such a metal is deposited on the foil prior to an over deposition of the solar selective coating.

However the present solar collector foil or sheet member is employed, its operation in harnessing solar energy is the same. Solar radiation, represented by arrows 28 in FIG. 1, passes through wall member 10, the interstitial, preferably evacuated space 12, and is absorbed by the solar selective coating 14 and converted to heat energy. This energy is transmitted through foil 13 to heat the emissive coating 15 which, in turn, radiates the heat energy through any space that may exist between it and wall member 11 or transmits the heat energy directly by contact with wall member 11. In this manner, foil 13 and its coatings act as a photothermal energy converter. Member 11 absorbs the radiation or heat otherwise transmitted by foil 13 and emissive coating 15 and heats the heat-absorbing working fluid 16 on its underside by conduction and convection. Heating fluid 16 may be utilized in any known, desired manner such as by passing the fluid through heat exchangers to heat or cool the interior of a home.

The following examples only illustrate the invention and should not be construed as imposing limitations on the claims.

EXAMPLE 1

This example illustrates the preparation of a foil in accordance with the invention and its incorporation into a solar collector.

A sheet of commercial aluminum foil sold under the trademark "Reynolds Wrap" was spray coated with an ultra flat black enamel comprising 50% carbon black and 50% alkali silicates by weight, as binders. The foil was wrapped around an absorber tube of a glass tubular solar collector of the type illustrated in FIG. 3 with the black enameled surface facing the tube. The outside surface of the foil was then optionally coated with aluminum by vacuum evaporation to increase the reflectivity of the foil and then further coated with black chrome by reactive evaporation of chromium. By this technique, pure chromium is evaporated but reacts in transit to the foil to form the oxide. The tube with the foil wrapping was then sealed into a cover tube of the tubular collector, vacuum baked for 16 hours at 750° F., and finally tipped off.

The foil had a thickness of about 1.5 mils and the optional aluminum vacuum deposition onto the foil had a thickness of about 800 angstroms. The evaporated black chrome had a thickness of about 800 angstroms. The emissive coating comprising the carbon black and binder had coating thicknesses of one to two mils. A stagnation test on the tubular solar collector in the sun with no clouds resulted in a temperature of the absorber element of 470° F. By stagnation temperature is meant the equilibrium temperature the test specimen eventually reaches upon exposure to the conditions described.

EXAMPLE 2

This example illustrates the increased long term stability of a foil of the present invention.

At times, solar energy collectors may not actually be in use for a wide variety of reasons. During these periods, it is customary to shut off the flow of a heat-absorbing medium through the collector, such as the heat-absorbing water 16 illustrated in FIG. 1. Unfortunately, it has been found that under such "no flow" conditions, the stability of the coatings on an absorber element is adversely affected. In particular, the period of desired stability is shortened.

A foil of the present invention has stability for a relatively long term. It is not nearly so susceptible to loss of stability under "no flow" conditions as other absorber elements. This was illustrated by the following comparative test.

Two tubular solar collectors of the type illustrated by FIG. 3 were used in which the absorber tube of one had a copper foil provided with a black chrome solar selective coating electroplated on one side and an emissive coating of carbon black on the other side. Overall the foil had a thickness of 2.8 mils and was wrapped around the tube. The other collector had coatings of aluminum and black chrome successively deposited on the absorber tube by vacuum evaporation techniques. Each tube under test was heated internally with a calrod heating element to a test temperature of 700° F.

Periodically during exposure to the calrod heating element, each collector tube was exposed to a solar simulator and the stagnation or equilibrium temperature of the absorber element determined. The solar simulator was a device designed to act like the sun and comprised an array of lamps used with projectors. Its heat output approximated one quarter of that received from the sun on a clear day. A falling stagnation or equilibrium temperature indicates that the absorber element was undergoing degradation as a result of exposure to the calrod heating test.

Figure 5:
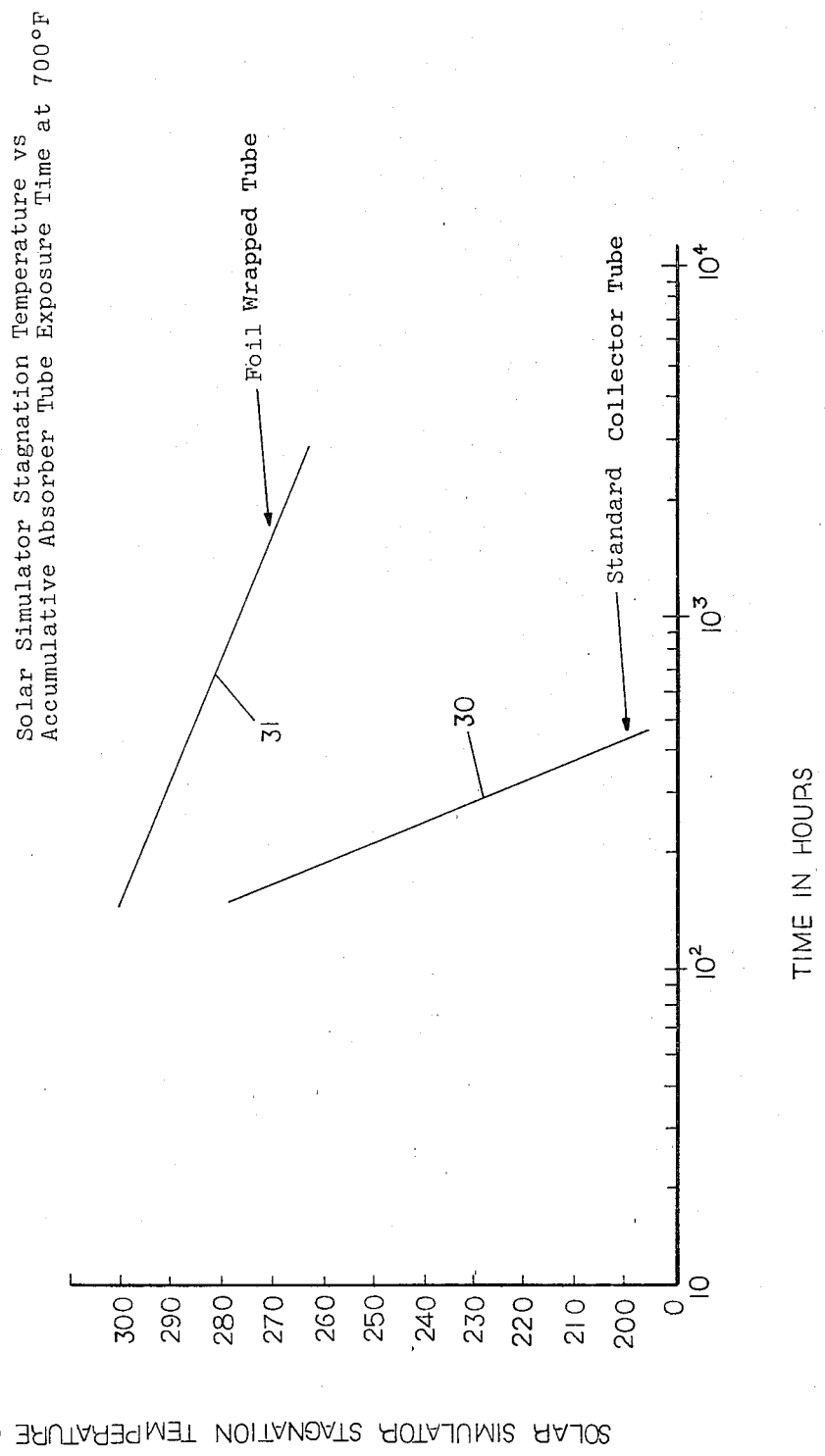
FIG. 5 is a graph showing the improved stability of a tubular solar collector having a coated foil absorber element of the present invention as compared to a tubular collector of the prior art.

FIG. 5 graphically illustrates the results obtained and indicates the superiority of the present foil. The graph compares the stagnation temperature obtained for each tube over accumulated time of exposure to the calrod heating element. Line 30 indicates the results for the standard collector. It failed after about 500 hours. A solar simulator temperature of below about 200° F. is considered a failure. Line 31 indicates the result for the collector having a foil of the present invention. It was virtually unaffected after almost 3,000 hours.

Although the foregoing describes several embodiments of the present invention, it is understood that the invention may be practiced in still other forms within the scope of the following claims.

I claim:

1. A solar energy collector comprising first and second spaced apart wall members said spaced walls defining therebetween a space, said space being evacuated, a coated foil between said wall members, and means forming a conduit for circulation of a heat-absorbing medium, in contact with the side of said second wall member remote from said coated foil, said coated foil having a solar selective coating on the side facing said first wall member, and an emissive coating thinner than said foil on the side facing said second wall member, said emission coating having high emissivity in the infrared spectrum.

2. The solar energy collector of claim 1 in which said coated sheet member is a metallic foil.

3. The solar energy collector of claim 1 in which said solar selective coating is a semi-conductor material.

4. The solar energy collector of claim 3 or 1 in which said wall members are substantially flat plates.

5. The solar energy collector of claim 3 or 1 in which said wall members are tubular, and said foil is disposed within the annular area between said wall members.

6. The solar energy collector of claim 3 or 1 in which said foil is metallic.

7. The solar energy collector of claim 1 in which said coated foil is supported by said second wall member.

8. The solar energy collector of claim 3 or 1 in which said solar selective coating is a semi-conductor material selected from the group consisting of black chrome, black nickel, black platinum, black molybdenum, black copper, black iron, black cobalt, black manganese, molybdenum carbide, copper sulfide, and compatible alloys thereof.

9. The solar energy collector of claim 3 or 1 in which said emissive coating comprises a material selected from the group consisting of glass, lampblack, and graphite.

10. The solar energy collector of claim 3 or 1 in which said wall members are glass.

11. The solar energy collector of claim 3 or 1 in which said solar selective coating is a semi-conductor material that is an incompletely oxidized oxide of a transitional metal element.

12. The solar energy collector of claim 3 or 1 in which the space between said spaced apart wall members has a subatmospheric pressure.

13. The solar energy collector of claim 3 or 1 in which said foil has a thickness from about 0.5 to 15 mils, and each of said solar selective and emissive coatings has a thickness from about 0.03 to about 5 mils.

14. A photothermal energy converter comprising a double walled glass construction having an interstitial space between said walls, said space being evacuated and containing in substantial parallelism with said walls a metallic foil coated on both sides, the side of said coated metal foil facing the outermost glass wall having a solar selective coating comprising a semi-conductor material, and the side of said coated foil facing said other wall member having an emissive coating having relatively high emissivity in the infrared spectrum.

15. A process for forming a solar energy collector comprising applying to one side of a foil a solar selective coating and applying to the other side of the foil an emissive coating having relatively high emissivity in the infrared spectrum, and then placing the foil between a transparent wall member adapted to face solar radiation and another wall member adapted to engage a heat-absorbing medium, the side of the foil having the solar selective coating being directed to said transparent wall member facing such solar radiation.

16. The process of claim 15 including the step of applying said emissive coating on the foil, placing the foil between said wall members and then applying said solar selective coating onto the foil.

17. The process of claim 16 in which said solar selective coating is applied to said foil by vacuum evaporation.

* * * * *